June 3, 1952     J. THORSTENSON     2,599,499
SPRING PLATE VALVE
Filed July 15, 1947
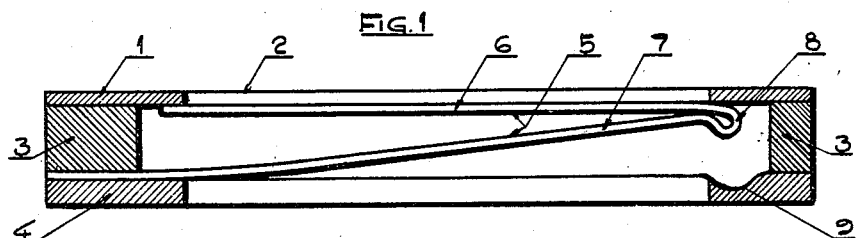
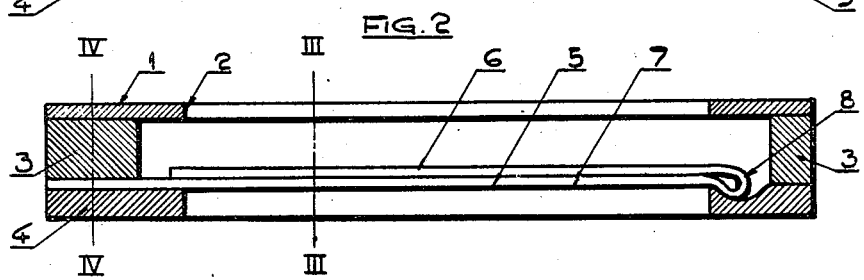
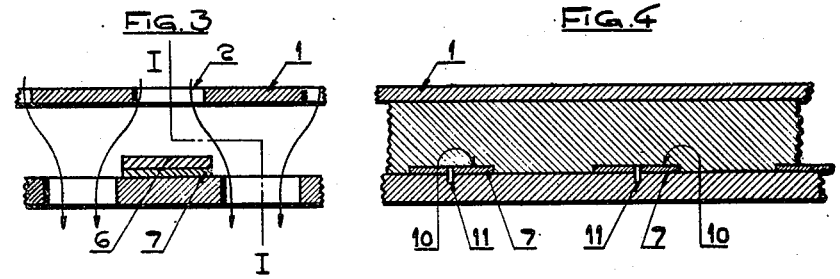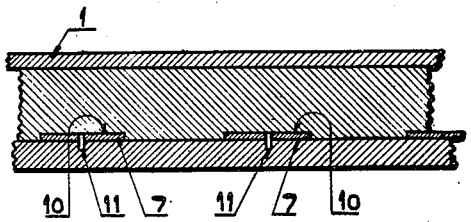
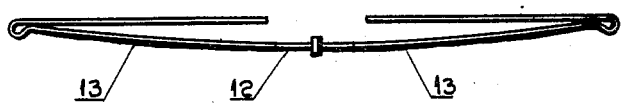
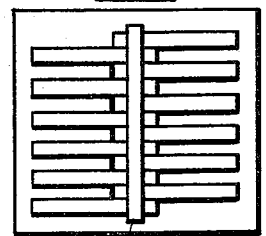
Johan Thorstenson
Inventor
By Cushman, Darby & Cushman
Attys.

Patented June 3, 1952

2,599,499

UNITED STATES PATENT OFFICE 2,599,499

SPRING PLATE VALVE

Johan Thorstenson, Goteborg, Sweden, assignor to Aktiebolaget Gotaverken, Goteborg, Sweden, a corporation of Sweden Application July 15, 1947, Serial No. 761,083
In Sweden February 16, 1945

Section 1, Public Law 690, August 8, 1946
Patent expires February 16, 1965

6 Claims. (Cl. 251—119)

This invention relates to a suction or pressure valve the casing of which includes a seal plate, an opposite abutting plate and a valve member located between said plates and consisting of a recurved strip of resilient material. The object of the invention is to provide an improved construction of such valve which is cheap in manufacture and reliable in operation.

In the annexed drawing, there is illustrated an embodiment of the invention. Figs. 1 and 2 show sections through a suction valve along the line I—I, Fig. 3. Fig. 1 shows the value in closed position and Fig. 2 in open position. Figs. 3 and 4 are different sections taken on the lines III—III and IV—IV, respectively, of Fig. 2. Fig. 5 shows a double-valve member, and Fig. 6 shows an arrangement of a plurality of single valve members in a valve having a plurality of parallel slots for the passage of the fluid.

The valve consists of a plane seat plate 1 provided with a plurality of slots or passageways 2. By means of distance pieces 3, the plate 1 is connected with an abutting plate 4 and constitutes together therewith a valve casing which contains valve members 5, the number of which corresponds to the number of slots in the seat plate. The valve member consists of a steel strip bent through an angle of about 180° and including a plane portion or arm 6 having a greater length and width than the slots 2 in the seat plate and serving as the sealing member proper. This plane portion is made in a single piece with an arm 7 which normally is located at an acute angle to the arm 6, the whole valve member being secured to the valve casing merely at the free end of the arm 7 which is clamped between the parts 3 and 4. The whole seat plate can be plane ground in a single operation without the necessity of paying regard to the dimensions and the location of the slots. The valve member may consist of strip steel of standard type which except for straightening of the plane portion 6 does not require any surface treating to secure perfect sealing of the valve. Grinding of various parts relative to each other and to the valve openings necessary in valve constructions of other types can be dispensed with in the present case. The angle between the arms of the spring plate has such a valve with respect to the distance between the plates 1 and 4 that the plane arm 6 of the valve member is pressed against the plate 1.

If the valve member due to variations in the pressure of the fluid is opened, the movement of the plane arm 6 will be substantially parallel to its original position, the final position of said arm at fully open valve being shown in Fig. 2. The fixed arm 7 is then throughout its whole length abutting against the plate 4, and oscillations of the valve member will be moderated as a result thereof. The abutting plate 4 is provided with passageways in a similar manner as the seat plate, but the passageways of the abutting plate are laterally displaced with respect to the passageways in the seat plate. Consequently, the valve will offer a slight resistance only to the flow of fluid in the compressed position of the valve member.

To secure the proper resilience and a great resistance of the arms of the valve member, the bend thereof is shaped as an I 8. In order to provide space for said I at fully open valve, a groove or recess 9 is provided in the abutting plate.

The fixed arm 7 is preferably somewhat longer than the arm located parallel to the seat plate. Said fixed arm is advantageously bent out of the direction of its main portion such that the clamped portion is located parallel to the free arm 6.

The valve members are advantageously fixed in the valve casing together with one of the distance pieces 3. As will be seen from Fig. 4, said distance piece is provided with recesses 10 corresponding to the width and thickness of the arm 7 of the valve member. Said arm is secured to the abutting plate by means of pins 11, and after the plates 1 and 4 and the distance pieces 3 have been bolted together, the valve members are secured in position.

In the case of very large valve areas, it may be unsuitable to have the slots and valve members extend throughout the whole width of the valve casing. In this case, the valve member may be doubled, as shown in Fig. 5 according to which a fixed intermediate portion 12 merges into two free arms 13, which are bent towards each other and constructed in a similar manner as indicated above. In this case, the slots in the seat plate are divided into two portions located in alignment to each other.

Alternatively, the slots may be divided into two portions, the portions located in one of the halves of the seat plate being laterally displaced with respect to the slots in the other half, as indicated in Fig. 6. The valve members are, in this case, alternatingly extending in opposite directions from the axis of the valve casing. Advantageously, all of the valve members are secured to the casing by means of a distance piece 14 extending centrally of the valve casing in a manner similar to that described above with reference to Fig. 4.

What I claim is:

1. A spring plate valve comprising a seat plate having a port therein, an abutting plate, means for maintaining said plates in spaced relation to each other, and a valve member located between said plates and consisting of a recurved strip of resilient material, said strip comprising a first arm located parallel to said seat plate and cooperating with said port so as to be responsive to fluid pressure applied through said port to move said first arm from the seat plate thereby allowing fluid to flow through said port but preventing fluid flow in the opposite direction, and a second arm fixed to said abutting plate at a point beyond the end of said port and having substantially the same free length as said first arm, said second arm being constructed and arranged when the parts are assembled to normally bias the first arm to valve closed position and in the open position of the valve to be located parallel to said first arm and in the closed position of the valve to extend obliquely through the space between said plates at an acute angle with respect to said first arm.

2. A spring plate valve comprising a seat plate having a port therein, an abutting plate, means for maintaining said plates in spaced relation to each other, and a valve member located between said plates and consisting of a recurved strip of resilient material, said strip comprising a first arm located parallel to said seat plate and cooperating with said port so as to be responsive to fluid pressure applied through said port to move said first arm from the seat plate thereby allowing fluid to flow through said port but preventing fluid flow in the opposite direction, and a second arm fixed to said abutting plate at a point beyond the end of said port and having substantially the same free length as said first arm, said second arm being constructed and arranged when the parts are assembled to normally bias the first arm to valve closed position and in the open position of the valve to be located parallel to said first arm and in the closed position of the valve to extend obliquely through the space between said plates at an acute angle with respect to said first arm, said second arm comprising a portion rigidly fixed to said abutting plate in parallel relation to said first arm.

3. A spring plate valve comprising a seat plate having a port therein, an abutting plate, members for spacing said plates apart from each other, and a valve member located between said plates and consisting of a recurved strip of resilient material, said strip comprising a first arm located parallel to said seat plate and cooperating with said port so as to be responsive to fluid pressure applied through said port to move said first arm from the seat plate thereby allowing fluid to flow through said port but preventing fluid flow in the opposite direction, and a second arm having its end clamped between said abutting plate and one of said spacing members, said spacing member having a recess corresponding to the width and thickness of said second arm, said second arm being constructed and arranged when the parts are assembled to normally bias the first arm to valve closed position and in the open position of the valve to be located parallel to said first arm and in the closed position of the valve to extend obliquely through the space between said plates at an acute angle with respect to said first arm.

4. A spring plate valve comprising a seat plate having a port therein, an abutting plate, means for maintaining said plates in spaced relation to each other, and a valve member located between said plates and consisting of a recurved strip of resilient material, said strip comprising a first arm located parallel to said seat plate and cooperating with said port so as to be responsive to fluid pressure applied through said port to move said first arm from the seat plate thereby allowing fluid to flow through said port but preventing fluid flow in the opposite direction, and a second arm fixed to said abutting plate and having substantially the same free length as said first arm, said strip being I-shaped at the place of junction between said arms, said second arm being constructed and arranged when the parts are assembled to normally bias the first arm to valve closed position and in the open position of the valve to be located parallel to said first arm and in the closed position of the valve to extend obliquely through the space between said plates at an acute angle with respect to said first arm.

5. A spring plate valve comprising a seat plate having a plurality of ports therein, an abutting plate, means for maintaining said plates in spaced relation to each other, a valve member located between said plates and consisting of a strip of resilient material, said strip comprising a central portion and two recurved portions, and means for securing said central portion to said abutting plate, each of said recurved portions comprising a first arm located parallel to said seat plate and cooperating with one of said ports so as to be responsive to fluid pressure applied to said port to move said first arm from the seat plate thereby allowing fluid to flow through said port but preventing fluid flow in the opposite direction, and a second arm merging into said central portion and being constructed and arranged when the parts are assembled to normally bias the first arm to valve closed position and in the open position of the valve to be located parallel to said first arm and in the closed position of the valve to extend obliquely through the space between said plates at an acute angle with respect to said first arm.

6. A spring plate valve comprising a seat plate having a plurality of ports therein, an abutting plate, means for maintaining said plates in spaced relation to each other, and a valve member located between said plates and consisting of a plurality of resilient recurved strips alternatingly extending in opposite directions, each of said strips comprising a first arm located parallel to said seat plate and cooperating with one of said ports so as to be responsive to fluid pressure applied to said port to move said first arm from the seat plate thereby allowing fluid to flow through said port but preventing fluid flow in the opposite direction, and a second arm fixed to said abutting plate and having substantially the same free length as said first arm, said second arm being constructed and arranged when the parts are assembled to normally bias the first arm to valve closed position and in the open position of the valve to be located parallel to said first arm and in the closed position of the valve to extend obliquely through the space between said plates at an acute angle with respect to said first arm.

JOHAN THORSTENSON.

REFERENCES CITED

The following references are of record in the file of this patent:

UNITED STATES PATENTS

| Number | Name | Date |
| --- | --- | --- |
| 756,869 | Mansfield | Apr. 12, 1904 |
| 1,227,759 | Day | May 29, 1917 |
| 1,672,125 | Heideman | June 5, 1928 |

FOREIGN PATENTS

| Number | Country | Date |
| --- | --- | --- |
| 18,175 | Great Britain | of 1906 |
| 41,314 | Switzerland | of 1907 |
| 132,429 | Germany | of 1922 |
| 691,832 | Germany | of 1940 |
| 757,463 | France | of 1933 |